G. W. RUE.
Hand-Cultivators.
No. 137,098.                                Patented March 25, 1873.
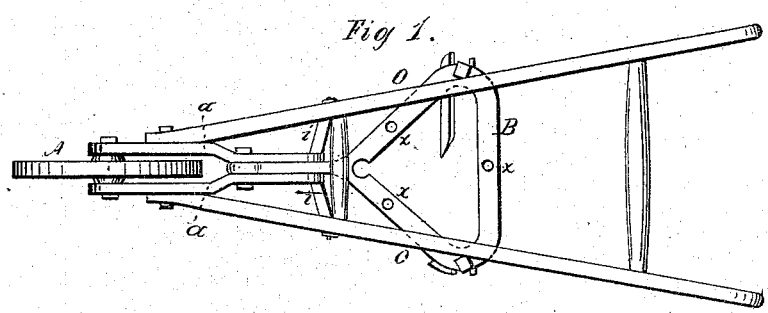
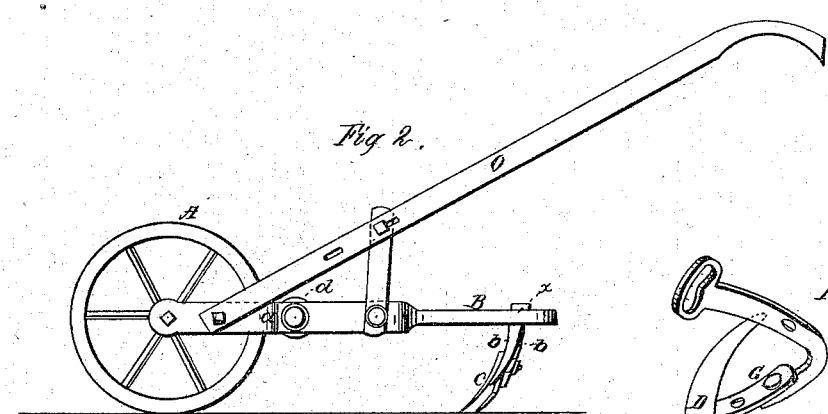
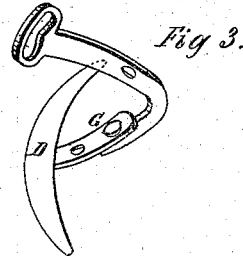
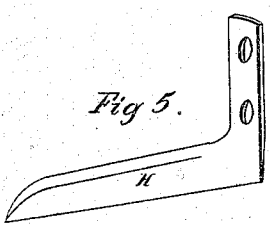
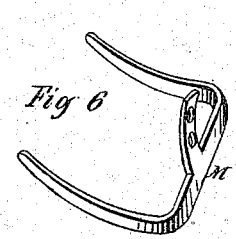
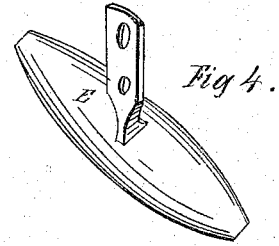
Witnesses.                                  Inventor.

UNITED STATES PATENT OFFICE.

GEORGE W. RUE, OF HAMILTON, OHIO.

IMPROVEMENT IN HAND-CULTIVATORS.

Specification forming part of Letters Patent No. 137,698, dated March 25, 1873.

*To all whom it may concern:*

Be it known that I, GEORGE W. RUE, of Hamilton, in the county of Butler and State of Ohio, have invented a new and useful Improvement in Hand Plows or Cultivators; and I do hereby declare that the following is a full and exact description thereof, reference being had to the accompanying drawing and to the letters of reference marked thereon.

My invention relates to certain improvements in interchangeable adjustable frames, and detachable and interchangeable knives and hoes, for various kinds of work to be performed with the hand-cultivator used by a single person.

Figure 1 represents a top view of my improved cultivator. Fig. 2 represents a side elevation of the same. Fig. 3 represents one of the interchangeable frames with the curved horizontal knife attached thereto. Fig. 4 represents the double-edged weed-trimming hoe. Fig. 5 represents the angular weeding-knife used for trimming upon the sides of ridges. Fig. 6 represents a two-bladed knife for cutting off the vines of sweet-potatoes preparatory to digging them. Fig. 7 represents a shovel for plowing.

In my cultivator two frame pieces, $a\ a$, in which the wheel-axle is journaled, extend rearward, and the handles $o$ are bolted to their sides, as represented in the drawing. The front end of the triangular frame B, which is a projecting beam, is provided with two bolt-holes, the front one of which is elongated vertically to permit the frame to be adjusted, and this triangular frame may be attached to and removed from its connection with the front frame $a\ a$ by means of screw-bolts and nuts. This rear frame B is provided with a number of vertical holes, $x$, in which the shanks of standards $b$ are inserted and held by screw-nuts, and to these standards shovels $c\ c$ of any desired shape may be bolted, as represented in Fig. 2. The plow-handles are connected with the frames by the slotted connecting-bars $i\ i$ by bolts and nuts, and may be adjusted vertically to any desired position. The knife D is formed with a curve to prevent weeds from adhering to it when in use.

When using either of the several cultivating-tools with the cultivator, the handles are to be grasped by the person working the implement, and the wheel will travel upon the ground as moved forward or backward, both of which movements will be given when the double-edged knife is attached, the wheel serving to gage the depth of the work and relieve the labor of the workman.

Either of the several tools may be secured upon any one of the standards $b$, and be used without the others, for the various purposes for which they are intended.

The two-bladed cutter M will be attached like any of the other removable tools to one of the standards $b$, and will be used for cutting off the vines of sweet-potatoes preparatory to the digging of them. By the use of this implement this difficult work can be accomplished quickly and efficiently.

I am aware that hand-plows have been in use, and that a patent was granted to Nelson Rue dated March 7, 1871, for an improvement in such a utensil; but to adapt it for the several purposes described I have devised the modifications in the adjustable frames, and have constructed the new interchangeable cultivating-tools to be used in combination with the frames, as herein described.

Having described my improvement in hand-cultivators, what I claim as my invention, and desire to secure by Letters Patent, is—

The combination of front frame $a\ a$ with frame B, or its equivalent, so constructed as to admit of the use of one or more of the standards $b$, upon which either of the interchangeable tools D E H M may be secured, substantially as described, for the purposes specified.

In testimony hereof I have this 19th day of October, A. D. 1872, subscribed my name hereunto.

GEORGE W. RUE.

Witnesses:
H. P. K. PECK,
ISRAEL WILLIAMS.